(12) United States Patent
Tanaka et al.

(10) Patent No.: US 6,456,796 B1
(45) Date of Patent: Sep. 24, 2002

(54) MANUAL AND ELECTRIC MOTOR OPERATED APPARATUS FOR LENS BARRELS

(75) Inventors: Minoru Tanaka; Keiji Kaneko; Hidetomo Tateno, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/504,038

(22) Filed: Feb. 14, 2000

(30) Foreign Application Priority Data

| | | | |
|---|---|---|---|
| Mar. 2, 1999 | (JP) | ............................................ | 11-054295 |
| Mar. 2, 1999 | (JP) | ............................................ | 11-054296 |
| Mar. 2, 1999 | (JP) | ............................................ | 11-054297 |
| Mar. 9, 1999 | (JP) | ............................................ | 11-060993 |

(51) Int. Cl.$^7$ .............................. G03B 3/10; G03B 13/34
(52) U.S. Cl. ......................... 396/131; 396/137; 396/133
(58) Field of Search ................................. 396/131, 133, 396/137; 359/694, 696, 697, 823

(56) References Cited

U.S. PATENT DOCUMENTS

| | | | | |
|---|---|---|---|---|
| 5,229,800 A | * | 7/1993 | Kanno et al. ................ | 396/137 |
| 5,633,680 A | * | 5/1997 | Kaneko et al. .............. | 348/357 |
| 6,285,511 B1 | * | 9/2001 | Kanayama et al. .......... | 359/696 |

OTHER PUBLICATIONS

Japanese Patent Office, *Patent Abstracts of Japan*, Publication No.: 02285311 A, Date of Publication: Nov. 22, 1990.

\* cited by examiner

Primary Examiner—Alan A. Mathews
Assistant Examiner—Arthur A Smith
(74) Attorney, Agent, or Firm—Snider & Associates; Ronald R. Snider

(57) ABSTRACT

The present invention provides a lens barrel apparatus dispensing with deliberate switching between manual and automatic operation modes and permitting quick adjustment of conditions regarding the object. In this apparatus, a gear moving plate of a clutch mechanism is connected to the external gear of a zooming or focusing ring, a gear fixing plate of the clutch mechanism is connected to a zoom motor, and the gear moving plate is operated by a clutch operating motor via a coil spring and a moving gear to connect and disconnect the fixed plate. When the clutch mechanism is disconnected, a movable disk and a coil spring are enabled to freely rotate by a thrust bearing. By operating the clutch mechanism on the basis of an operational control signal for a zooming switch, switching between manual and electric operation modes is automatically accomplished. Further the manual operation torque of the zooming ring can be either adjusted with a volume control device or automatically maintained at a constant level. Further, if focusing is done when the zoom is set for manual operation, any variation in the angle of field due to a pumping phenomenon is corrected with a correcting circuit.

12 Claims, 13 Drawing Sheets

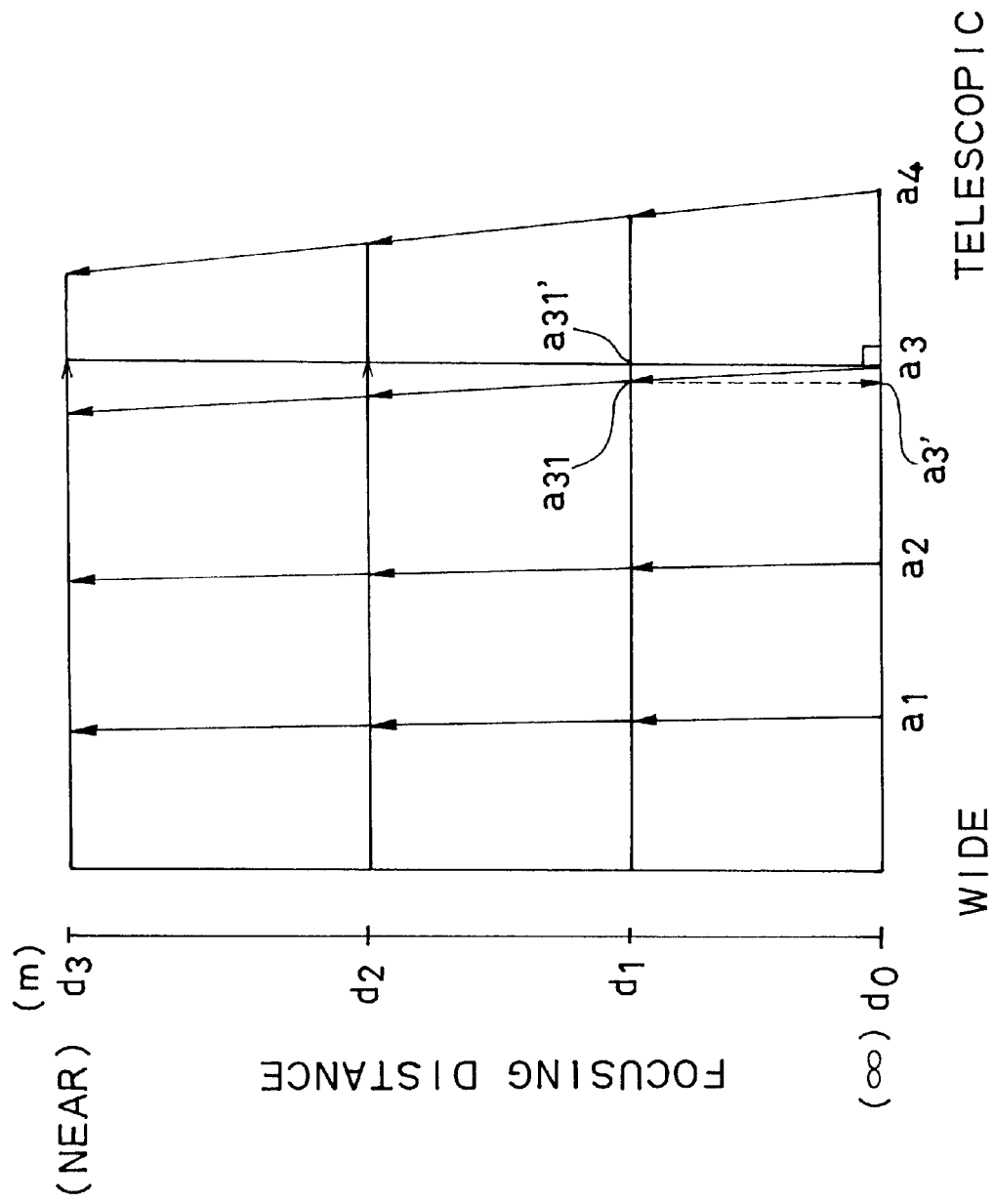

MANUAL AND ELECTRIC MOTOR OPERATED APPARATUS FOR LENS BARRELS

BACKGROUND OF THE INVENTION

This application claims the priority of Japanese Patent Applications Nos. 11-54295,11-54296, 11-54297, filed on Mar. 2. 1999, No. 11-60993 filed on Mar. 9, 1999, which are incorporated herein by reference.

1. Field of the Invention

The present invention relates to a manual and electric motor operated apparatus for lens barrels, and more particularly to an apparatus permitting both manual and electric operations without deliberate switching in driving the zooming and focusing functions of the lens unit.

2. Description of the Prior Art

According to the prior art, a lens barrel for use in photographic cameras or television cameras is provided with a focusing lens for focusing and/or a zoom lens for varying the rate of magnification, and permits switching between manual and electric (automatic) operation modes (e.g. Japanese Patent No. 2773230).

FIGS. 13(A) and 13(B) illustrate an example of configuration concerning zoom driving in a conventional lens barrel. In FIG. 13(B), the left side of a barrel 1 in the drawing is its front side, and the barrel 1 is provided with a zooming ring 3 which is rotatable relative to a body ring 2. This zooming ring 3 is configured to be movable a zoom lens in the direction of the optical axis by its internal mechanism. Also, on the circumference of this zooming ring 3 are formed external gear 4, and to the body ring 2 are fitted a switching gear 6 and a shaft 6A via a bearing member 5, the shaft 6A being separately formed from the switching gear 6, which pivots on the shaft 6A movably in the axial direction and rotatably.

The above mentioned switching gear 6 has, as illustrated, a first toothed wheel 6B engaging with the shaft gear 8 of a zoom motor 7, and a second tooth wheel 6C moving forward to engage with the external gear 4 of the above mentioned zooming ring 3. Furthermore, a switching knob 10 is provided to switch between manual and electric operating modes by a rotational action, and a drive pin 11, fitted to the underside disk of this switching knob 10, is arranged in a concave portion between the above mentioned first toothed wheel 6B and second toothed wheel 6C.

In the above mentioned configuration, when the switching knob 10 is turned into the position of FIG. 13(A), the mechanism is set for manual operation, and the switching gear 6 moves backward to disengage from the external gear 4 of the zooming ring 3. In this state, therefore, the zooming ring 3 can be manually turned, and this turning drives the zoom lens to a desired rate of magnification.

On the other hand, as the switching knob 10 is turned clockwise from the state of FIG. 13(A), the mechanism is switched to electric (automatic) operation. This switching knob 10, by the turning of its drive pin 11 to the position of the chain line in the drawing, moves the switching gear 6 forward, and engages the second toothed wheel 6C with the above mentioned external gear 4. At this time, the other first toothed wheel 6B does not disengage from the shaft gear 8 of the zoom motor 7. Therefore, when in electric operation, pressing a zooming switch (not shown) turns the zoom motor 7, and this in turn causes the zooming ring 3 to be rotated via the switching gear 6, with the result that the zoom lens is enabled to be driven in a prescribed direction.

However, the above mentioned lens barrel, which can be switched between manual and automatic operation modes, requires a manual switching action to turn the switching knob 10 as stated above, and this action is troublesome. Moreover, this switching action may prevent, for instance, quick focusing on the object to deprive the photographer of a good shooting opportunity.

Also, since the optimal level of heaviness (operation torque) of manipulating the zooming ring 3 as described above may vary with the manual power or preference of the photographer, making it variable as desired would improve the handling case of the camera.

There is the further problem that the level of heaviness (operation torque) of manipulating the zooming ring 3 may vary with the type of the lens and/or other conditions. Thus in such an apparatus, which allows replacement of one type of lens barrel with another, or where various lens barrels are to be fabricated with different lenses built into them, lens barrels even of the same type may vary from one another in fine details, and if they do, the lens driving torque will vary from barrel to barrel. Moreover, the torque may subtly vary with a number of conditions including the ambient temperature and how grease is applied. Such fluctuations in driving torque would pose little problem in electric operation, but in manual operation they would be sensed as differences in actual operation torque.

Furthermore, in an apparatus having a conventional zooming function, a so-called pumping phenomenon, i.e. a change in the angle of field, theretofore occurs when the focusing lens is moved. Thus, in this phenomenon which is more conspicuous at the wide angle end, focusing may invite, for instance, narrowing of the angle of field, therefore resulting in a slightly expanded image.

BRIEF SUMMARY OF THE INVENTION

Object of the Invention

The present invention has been attempted in view of the problems noted above, and its first object is to provide a manual and electric motor operated apparatus for lens barrels which can dispense with deliberate switching between manual and automatic modes and allow quick adjustment of conditions regarding a given object.

A second object is to enable the torque of manual operation to be freely set for the apparatus which requires no deliberate switching between and manual and automatic modes, and a third object is to prevent the operating torque from being varied by the type of lens and/or other conditions.

A fourth object is to enable the apparatus which requires no deliberate switching between and manual and automatic modes to correct any pumping phenomenon that may arise during a focusing action.

SUMMARY OF THE INVENTION

In order to attain the above mentioned first object, a manual and electric motor operated apparatus for lens barrels comprising: a lens barrel for holding lenses movably; an electric motor for automatically moving the lenses; a lens operating ring (manually operating ring), arranged rotatably on the circumference of these lenses for manually moving the lenses, having external gear formed thereon to engage with a transmission gear for transmitting the revolutions of the electric motor; a clutch mechanism for connecting and disconnecting the external gear of this lens operating ring and the electric motor to and from one another; and a clutch operating motor for connecting and disconnecting this clutch mechanism.

The clutch mechanism may have a gear moving plate (clutch disk) which is moved by the above mentioned clutch operating motor in the axial direction and has a gearing function and a gear fixing plate (clutch disk) which is connected to the gear moving plate and has a gearing function, wherein one of these gears is connected to the electric motor side and the other is connected to the external gear of the lens operating ring; and a revolving-while-declutched mechanism for enabling the gear (clutch disk) connected to the external gear of the lens operating ring to rotate when the clutch mechanism is disconnected.

Further, it is preferable to execute an action to connect the clutch mechanism when an operation control signal is supplied from an electric operation switch And to execute an action to disconnect the clutch mechanism when the operation control signal is no longer supplied.

The above mentioned configuration, in which the clutch mechanism is disconnected during manually operation, can drive the zoom lens and the focusing lens by turning the lens operating ring. In that state, the gear moving (or fixing) plate connected to the external gear of the lens operating ring is allowed by the revolving-while-declutched mechanism to turn freely, and accordingly imposes no operational load on the lens operating ring. On the other hand, when the electric operation switch for zooming and focusing is pressed, the clutch operating motor actuates the clutch mechanism and causes the gear moving plate to be connected to the gear fixing plate, so that revolutions by the electric motor are transmitted to the lens operating ring via a gear train and a prescribed lens is thereby driven. If, then, the electric operation switch is released, the connection of the clutch mechanism is released to place the apparatus in a state of standby by for manual operation.

In order to attain the second object mentioned above, according to another aspect of the invention, there is provided an operation torque varying unit using the above mentioned clutch operating motor to adjust the pressing force of the frictional face of the clutch mechanism during the disconnecting action and thereby vary the manual operation torque of the lens operating ring. Where this configuration is used, as stated above with reference to the first aspect of the invention, when the electric operation switch for zooming and focusing is released, the connection of the clutch mechanism is released to place the apparatus in a state of standby for manual operation, and in this state the above mentioned operation torque varying unit causes the pressing force of the frictional face of the clutch mechanism to be adjusted to any desired level designated with a volume control device or the like. Therefore, operation torque given in the above mentioned state of pressing the frictional face is provided to the lens operating ring, enabling the operator to perform manual operation with any operation torque set as desired.

In order to achieve the third object mentioned above, according to another aspect of the invention, there is provided an apparatus comprising a torque detecting circuit for detecting the drive torque for the above mentioned lenses at the time of driving by the electric motor, and an operation torque setting unit for providing a manual operation torque to the lens operating ring by using the clutch operating motor to cause the clutch mechanism, when it is disconnected, to generate its frictional force and maintaining and setting the manual operation torque at a prescribed level by adjusting the above mentioned frictional force on the basis of the output of the torque detecting circuit.

According to this other aspect of the invention, the torque detecting circuit detects the drive torque for the lenses from, for instance the drive current for the electric motor, and the operation torque setting unit, referencing this drive torque level, controls the frictional force if the clutch mechanism, i.e. the slip torque in the clutch mechanism. When the drive torque has been made heavier by, for instance, a lens change, the slip torque is alleviated and when, conversely, the drive torque has become lighter, the slip torque is increased thereby to keep the operation torque constant.

In order to achieve the fourth object stated above, according to another aspect of the invention, there is provided an apparatus comprising an electric motor for automatically moving a zoom lens arranged in a lens barrel; a zooming ring arranged rotatably on the circumference of the lens barrel, for manually moving the zoom lens; a clutch mechanism for connecting and disconnecting the zooming ring and the electric motor to and from each other; a clutch operating motor for connecting and disconnecting the clutch mechanism; and an angle of field correcting unit for connecting, when focusing has been executed when manual zooming is set (during standby for manual operation), the clutch mechanism by using the clutch operating motor and correcting any change in the angle of field due to focusing.

According to this other aspect of the invention, if focusing is done (either manually or electrically) when a state of standby for manual operation has been entered into by disconnecting the clutch mechanism, the clutch mechanism will be connected, and a correction signal, which is calculated on the basis of the set focusing position and a signal of the current zooming position, is supplied to the electric motor. As a result, the zoom lens, for instance, is driven toward the wide angle side to correct the change in the angle of field due to focusing.

BRIEF DESCRIPTION OF THE DRAWINGS

FIG. 12 is an explanatory diagram showing one example of pumping correction by the fourth embodiment.

DETAILED DESCRIPTION OF THE PREFERRED EMBODIMENTS

First Embodiment

Figure 1:
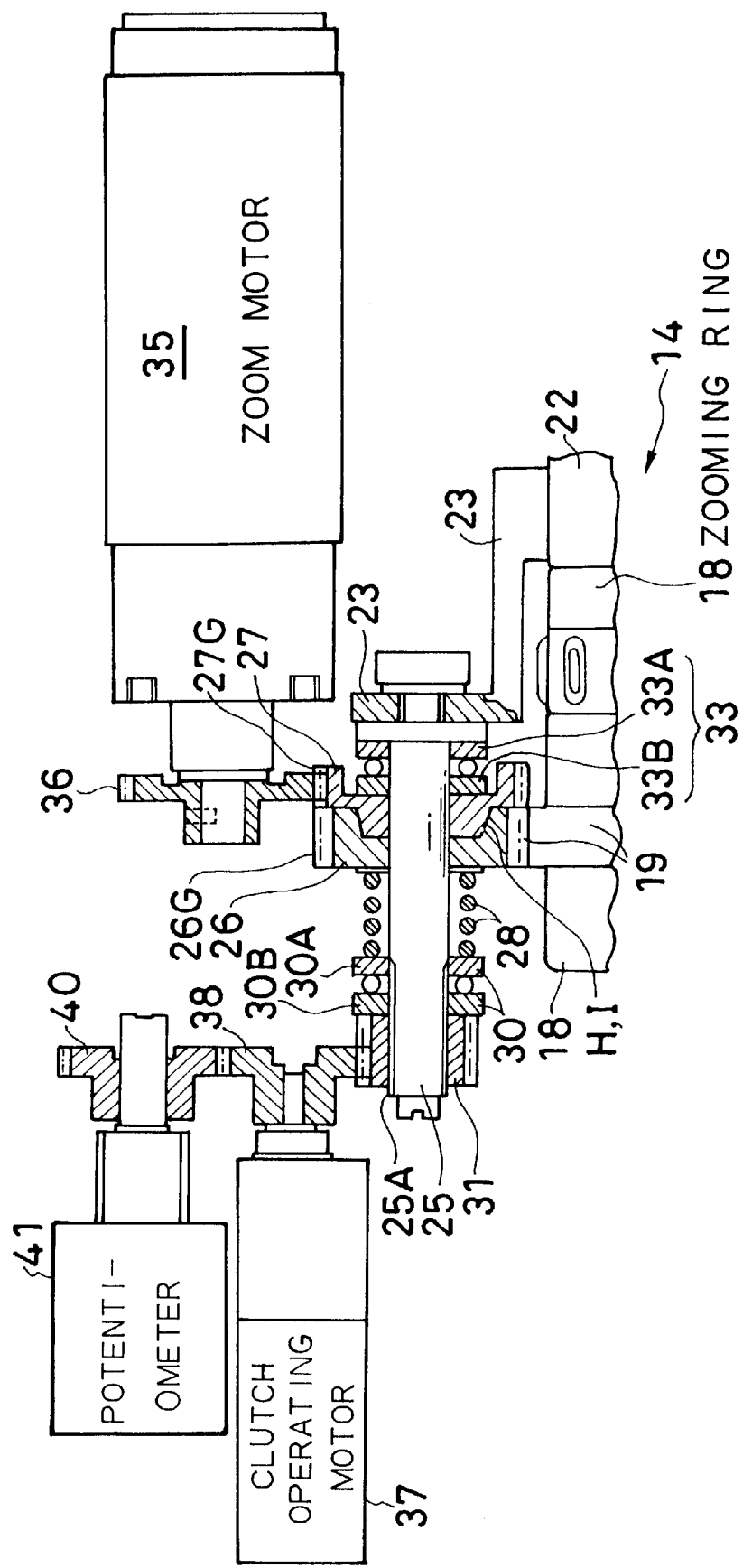
FIG. 1 illustrates the configuration of a manual and electric motor operated apparatus for lens barrels pertaining to a first embodiment of the present invention with a clutch mechanism in a connected state.
Figure 2:
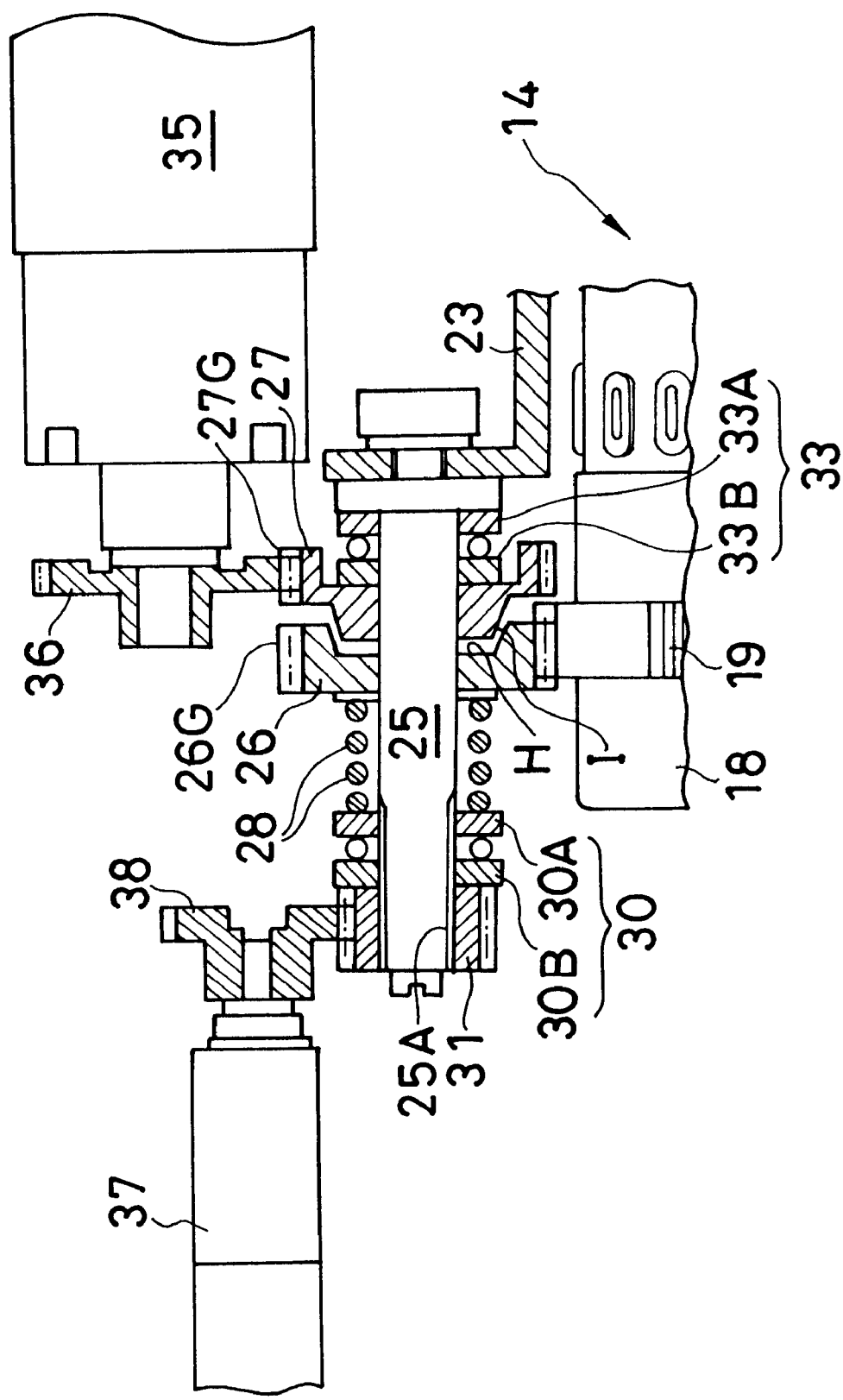
FIG. 2 illustrates the manual and electric motor operated apparatus of FIG. 1 with the clutch mechanism in a disconnected state.
Figure 3:
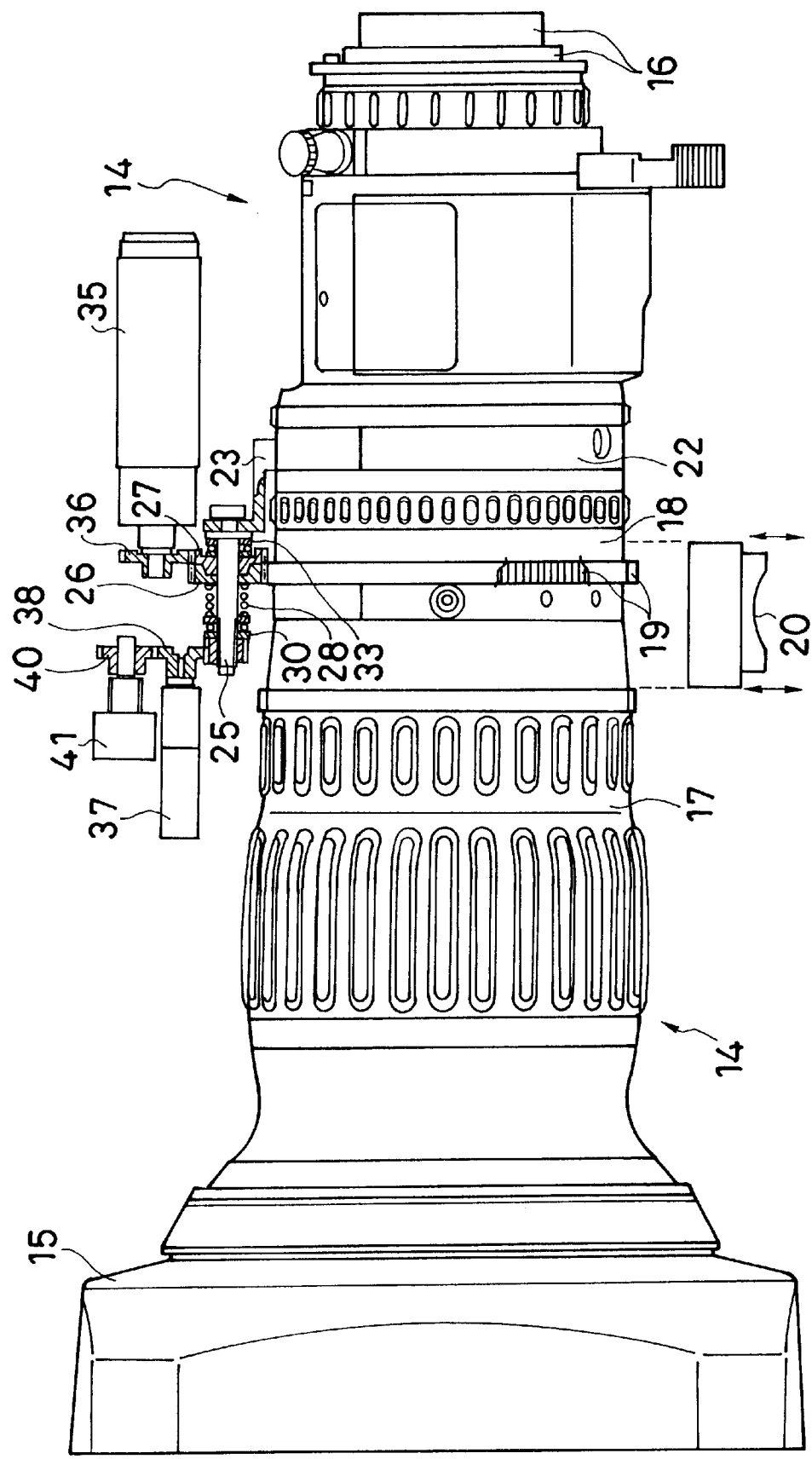
FIG. 3 illustrates an overall configuration of the apparatus embodying the invention.

FIGS. 1 through 4 illustrate the structure of a manual and electric motor operated apparatus for lens barrels, which is the first embodiment of the invention. First will be described an overall configuration of a lens barrel with reference to FIG. 3. A lens barrel 14 shown in FIG. 3 is fitted with a hood 15 at its front end and can be connected to a camera body by a connector 16 at its rear end. On the circumference of this lens barrel 14 are fitted a focusing ring 17 and a zooming ring (lens operating ring) 18 to be manually rotatable, and on the circumference of this zooming ring 18 are formed external gear 19 for use in electric driving.

Further, a zooming switch 20 for zooming operation is fitted to a handle (K in FIG. 7) of the like arranged on the circumference of the lens barrel 14. This zooming switch 20 consists of a seesaw switch whose two ends, one set in the telescopic (expanding) direction and the other set in the wide angle (contracting) direction, are moved up and down like a seesaw, and is set to increase the varying speed according to, for example, the pressed depth. To the body ring 22 of this lens barrel 14 are fitted, as illustrated in FIG. 1, a clutch mechanism and a revolving-while-declutched mechanism via a supporting member 23.

Referring to FIG. 1, a main shaft 25 is fixed to the upper part of the supporting member 23, and a movable disk (gear moving plate) 26 and a fixed disk (gear fixing plate) 27 are fitted rotatably to the circumference of this main shaft 25. On the circumferences of these movable disk 26 and fixed disk 27 are formed external gears 26G and 27G, respectively, to have the functions of both a clutch disk and a gear. With the external gear 26G of this movable disk 26 engage the external gear 19 of the zooming ring 18. In the movable disk 26 and fixed disk 27 both functioning as clutch disks are respectively formed, as illustrated, a round groove H having tapered sides and, engaging with this round groove H, a fitting projection I similarly having tapered sides. This movable disk 26 is provided with a first thrust bearing 30 via a coil spring 28, and pressed by this coil spring 28 toward the fixed disk 27. Therefore, the contact between the round groove H and the fitting projection I and the pressure of the coil spring 28 achieve clutching.

Further, a disk 30A of the first thrust bearing 30 on the coil spring contacting side (rear side) is rotatable on the circumference of the main shaft 25, the other front side disk 30B is fixed to a moving gear 31, and these disk 30B and gear 31 screw into a threaded part 25A formed on the front side of the main shaft 25. Therefore, the disk 30A, coil spring 28 and movable disk 26 rotate separately from the moving gear 31 (and also separately from the fixed disk 27), and thereby function as a revolving-while-declutched mechanism to allow the movable disk 26 to freely revolve during manual operation.

On the other hand, the fixed disk 27 is also provided with a second thrust bearing 33, and in this bearing 33 a rear side disk 33A is fixed to the main shaft 25 while a front side disk 33B revolving with the fixed disk 27. With the external gear 27G of this fixed disk 27 engages an axial gear 36 of the zoom motor 35. Accordingly, in a state wherein the movable disk 26 is connected to the fixed disk 27, the rotational driving force of the zoom motor 35 is provided to the zooming ring 18 via the axial gear 36, fixed disk external gear 27G, movable disk external gear 26G and external gear 19.

There is further provided a clutch operating motor 37 for driving the clutch mechanism, and an axial gear 38 of this motor 37 is engaged with the moving gear 31 on the first thrust bearing 30 side. Therefore, by turning this clutch operating motor 37 in a prescribed direction, the moving gear 31 can be rotated and let proceed backward and the movable disk 26 can be pressed against the fixed disk 27, while the movable disk 26 can be separated from the fixed disk 27 by turning the motor 37 in the reverse direction. Further, to the axial gear 38 of this clutch operating motor 37 is connected a potentiometer 41 via a gear 40, and this potentiometer 41 will detect the revolving state of the moving gear 31 on the first thrust bearing 30 side, i.e. the pressed state of the movable disk 26.

Figure 4:
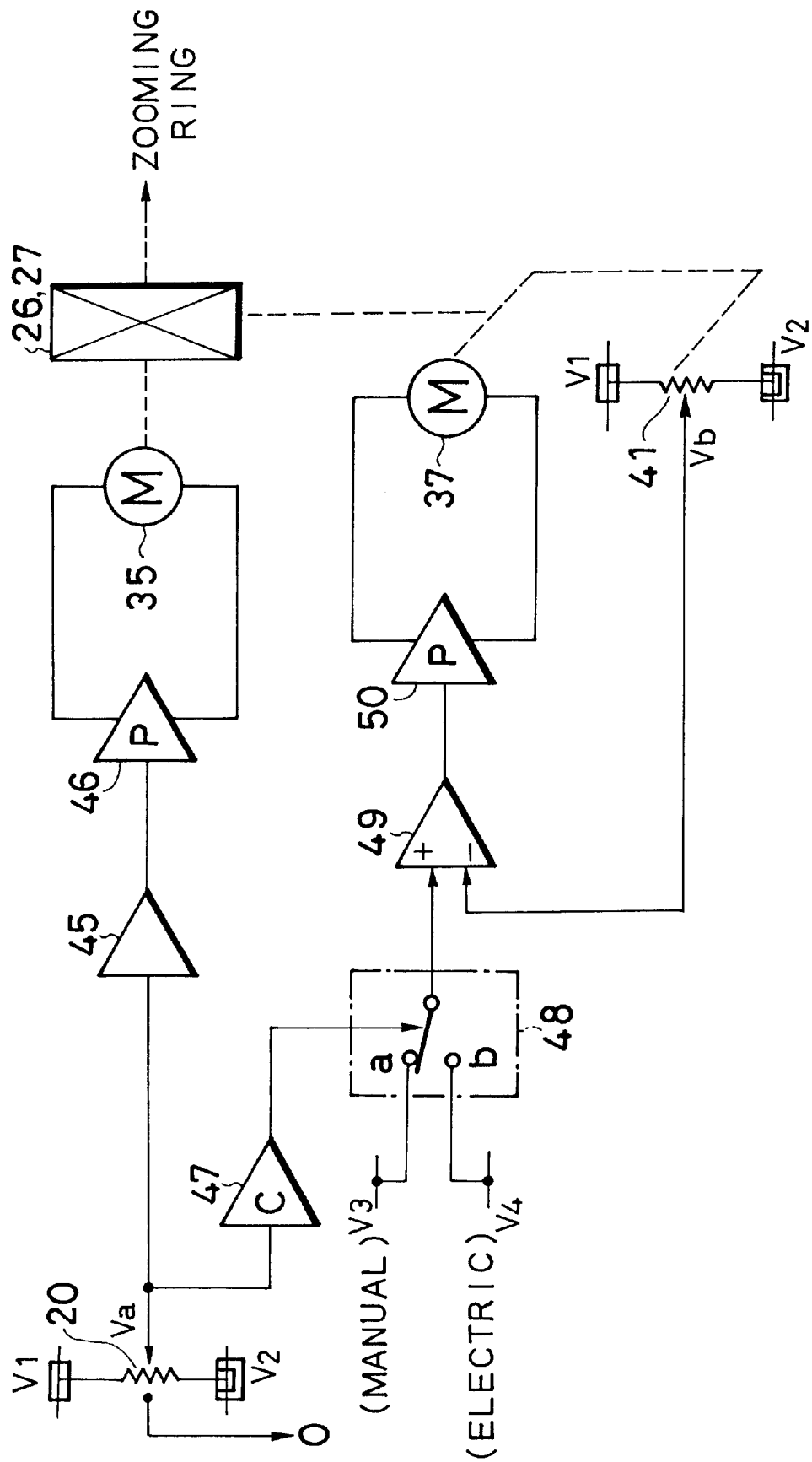
FIG. 4 is a circuit diagram illustrating the electric configuration of the first embodiment.

FIG. 4 illustrates the electric configuration of the apparatus, wherein the zooming switch 20 on the left side generates a voltage Va between reference voltages V1 and V2, the middle point of the seesaw action being supposed to be 0. To this zooming switch 20 is connected a power amplifier 46 of the zoom motor 35 via a preamplifier 45, which, as described above, drives the zooming ring 18 via the fixed disk 27 and the movable disk 26.

There is further provided a comparator 47, into which the output of the zooming switch 20 is entered to check whether or not there is any variation in this output voltage Va, for supplying a high signal if there is and supplying a low signal if there is not. To this comparator 47 is connected a switch 48 for switching between manual and automatic (electric) operating modes. This switch 48 is connected to a terminal a to set a positional control voltage V3 for manual operation when the comparator 47 is supplying a low signal, and is connected to a terminal a to set a positional control voltage V4 when the comparator 47 is supplying a high signal.

Following the switch 48 is provided a computing unit 49 for computing the difference between the output voltage of the switch 48 and the output voltage Vb of the potentiometer 41 shown in the lower part of the drawing, and to this computing unit 49 is connected a power amplifier 50 of the clutch operating motor 37 to enable the circuit to perform servo control.

With such a configuration, as the comparator 47 detects any variation in the voltage Va to supply a high signal when the zooming switch 20 is operated, and the switch 48 supplies the voltage V4 in response to its switching to the terminal b, the computing unit 49 computes V4−Vb. This output voltage Vb being so set, for instance, as to be supplied with the disconnecting position of the movable disk 26 represented by V3 and its connection position represented by V4, since the movable disk 26 is in the disconnecting position then, the voltage computed by subtracting V3 from V4−V3 is supplied to the power amplifier 50 to actuate the clutch operating motor 37 and to drive the movable disk 26 to its connecting position. When this movable disk 26 reaches its connecting position, Vb=V4 is supplied from the potentiometer 41 with the result that the output of the computing unit 49 is reduced to 0 to stop the motor 37. To add, in this state, the power amplifier 46 drives the zoom motor 35 on the basis of the output voltage Va of the zooming switch 20 to accomplish zooming.

On the other hand, as the voltage Va is reduced to 0 when the zooming switch 20 is released from pressing down, the switch 48 is switched to the terminal a in response to the low signal to supply the voltage V3, so that the computing unit 49 computes V3–V4, the power amplifier 50 into which this differential voltage is entered reverses the clutch operating motor 37 to drive the movable disk 26 to its disconnected position. As Vb=V3 is supplied from the potentiometer 41 when the movable disk 26 has reached its disconnecting position, the output of the computing unit 49 is reduced to 0 to stop the motor 37.

The overall operation of the first embodiment, whose configuration has been described so far, will now be explained. Whereas FIG. 1 illustrates a state in which the clutch mechanism is connected and the zooming switch 20 is pressed down, when the zooming switch 20 is released from this pressing down, the setting of the manual control voltage V3 by the switch 48 causes the movable disk 26 of the clutch mechanism to be disconnected from the fixed disk 27 as described with reference to FIG. 4. This state is shown in FIG. 2, wherein the clutch operating motor 37 turns to revolve the screwed moving gear 31 via the axial gear 38 with the result that members from this moving gear 31 to the movable disk 26 are moved to the front (the left side in the drawing). As a result, the movable disk 26 is separated from the fixed disk 27 into a disconnected state. Though the space between the two disks 26 and 27 is exaggerated in the illustration to make the disconnected state well noticeable, the disks need to be separated from each other by only a narrow margin.

As the zooming switch 20 is released from its pressed down state, the zooming ring 18 becomes manually operable, and it becomes possible to drive the zoom lens to match that operating direction. Although the movable disk 26 and the coil spring 28 are also turned by their engagement with the movable disk external gear 26G simultaneously with the rotation of the zooming ring 18, there will arise no load which would obstruct operation because these members are made rotatable relative to the moving gear 31 by the thrust bearing 30.

Next, if the zooming switch 20 is pressed in the state shown in FIG. 2, the switch 48 will set the electric control voltage V4 in response to detection by the comparator 47 of FIG. 4, with the result that the clutch operating motor 37 turns on the basis of the positional control voltage V3 (Vb) of the potentiometer 41 and the computed value V4–V3, and the resultant movement of the moving gear 31 screwed into the main shaft 25 to the rear side causes the movable disk 26 to be pressed against the fixed disk 27 via the coil spring 28 as illustrated in FIG. 1. This connection of the clutch mechanism causes the revolutions of the zoom motor 35 to be transmitted to the zooming ring 18 via the gear 36, fixed disk external gear 27G and movable disk external gear 26G to automatically drive the zoom lens according to the operating direction and the extent of pressing of the zooming switch 20.

In the above mentioned first embodiment, the movable disk 26 is set to be connected to the zooming ring 18. However, it is possible to adopt another configuration in which, for example, the external gear 27G of the fixed disk 27 is connected to the external gear 19 of the zooming ring 18, and the movable disk external gear 26G of the movable disk 26 is connected to the axial gear 36 of the zoom motor 35, and so forth. Furthermore, the above mentioned configuration can be also applied to a focus operating ring.

As described so far, the first embodiment of the invention is provided with a clutch mechanism consisting of a gear moving plate and a gear fixing plate among other elements to connect the revolutions to the circumferential gear of the lens operating ring and to undo this connection, and the clutch mechanism is operated by a clutch operating motor on the basis of determination as to whether or not a lens control signal is supplied from an electric operation switch, so that no deliberate switching between manual and automatic operating modes is required in driving the lenses, and the adjustment of conditions to the object can be accomplished quickly. Moreover, a revolving-while-declutched mechanism can contribute to satisfactory reduction of the load during manual operation.

Second Embodiment

Figure 5:
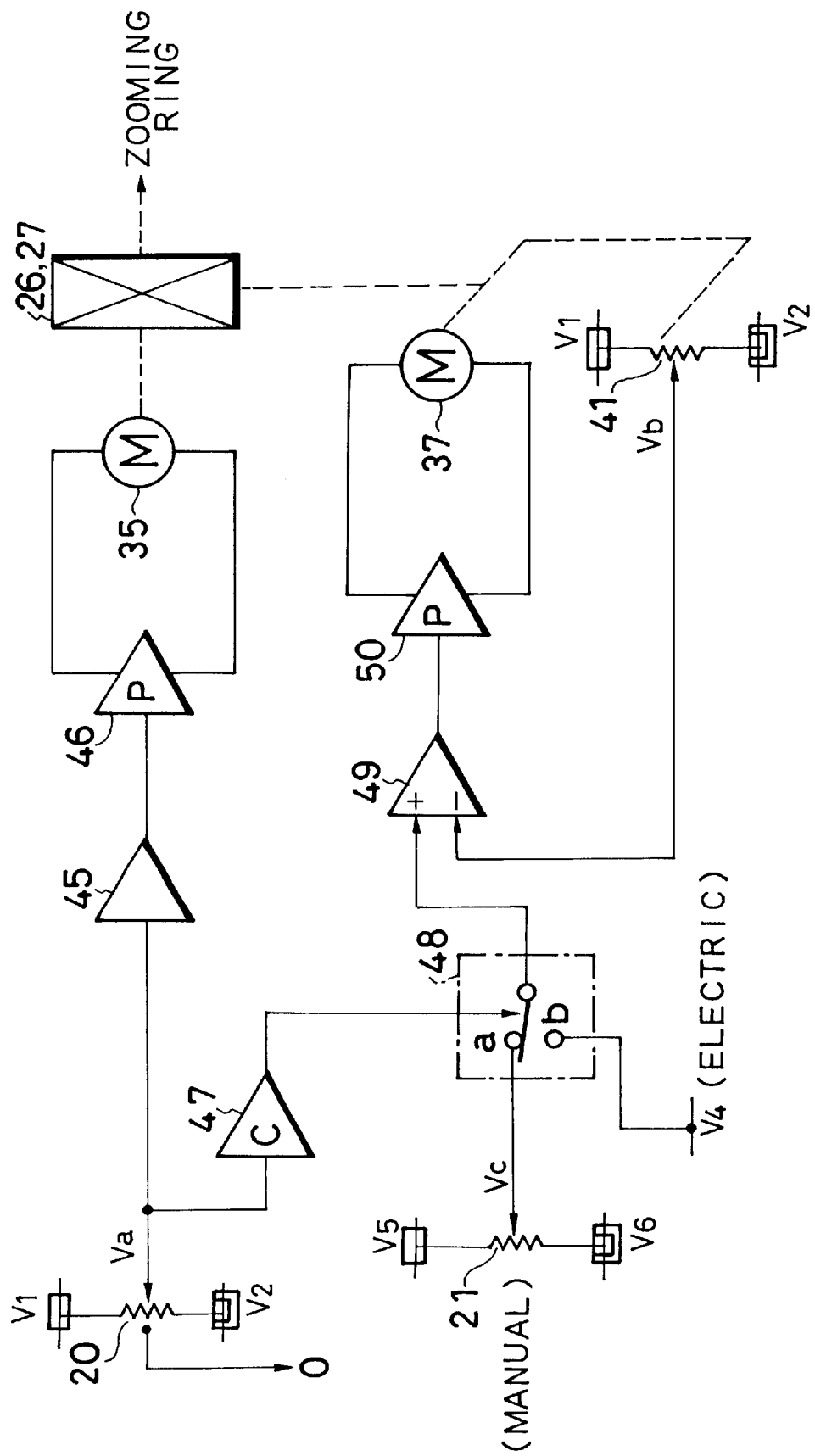
FIG. 5 is a circuit diagram illustrating the electric configuration of a manual and electric motor operated apparatus for lens barrels pertaining to a second preferred embodiment of the present invention.
Figure 6:
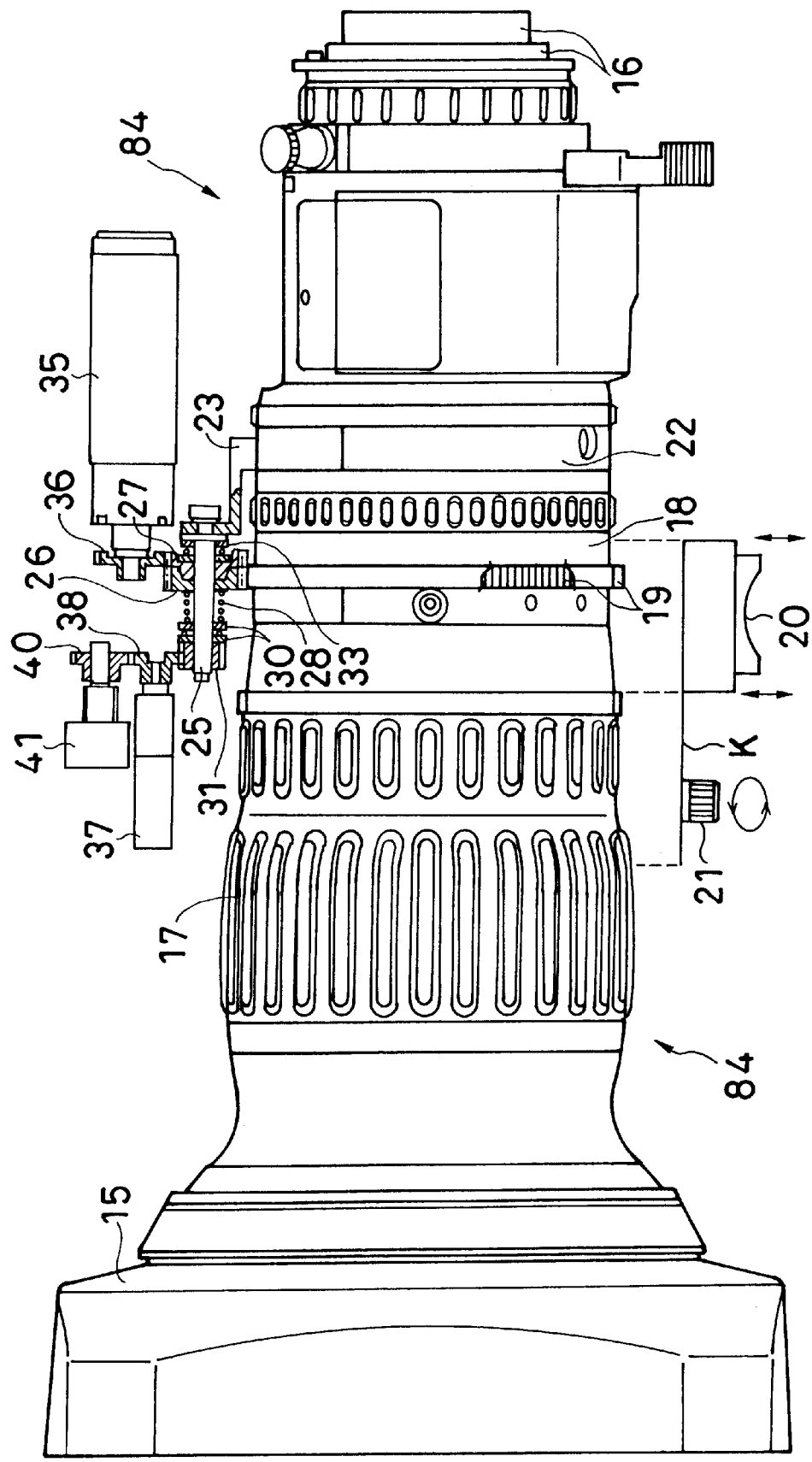
FIG. 6 illustrates an overall configuration of the apparatus which is a second embodiment of the invention.
Figure 7:
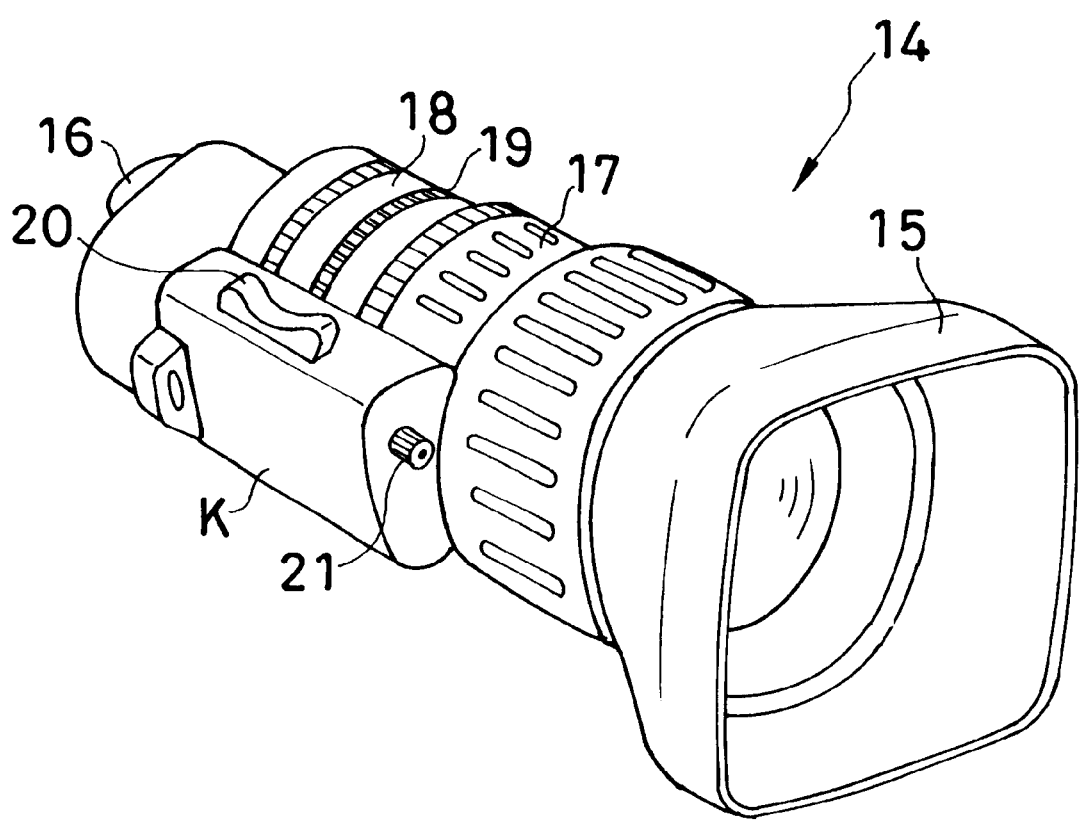
FIG. 7 shows a schematic perspective view of the lens barrel in the second embodiment.

FIGS. 5 through 7 illustrate the structure of a second embodiment, of which the basic configuration of the lens barrel is similar to that of the first embodiment. To a lens barrel 84 shown in FIG. 6 are fitted a focusing ring 17 and a zooming ring 18 to make it manually rotatable, and to a handle K arranged on the circumference of this lens barrel 84 are fitted a zooming switch 20 for zooming operation and a volume control device 21 to variably set the operation torque. This volume control device 21, as will be described in further detail below, is intended to adjust the pressing force of the frictional face of the clutch mechanism by utilizing a variable resistor. To the body ring 22 of this lens barrel 84 are fitted, as illustrated in FIG. 1, the clutch mechanism and the revolving-while-declutched mechanism via a supporting member 23.

In the second embodiment, the rotational position of the moving gear 31 is varied using the clutch operating motor 37 and the pressing force (frictional force) of the movable disk 26 on the fixed disk 27 via the coil spring 28 is adjusted, thereby to vary the manual operation torque of the zooming ring 18.

In FIG. 5 illustrating the electric configuration of the second embodiment, the switch 48 is connected to the terminal a and sets the positional control voltage Vc variably supplied from the volume control device 21 when the comparator 47 is supplying a low signal, or switches to the terminal b and sets the positional control voltage V4 when a high signal is being supplied. Thus the volume control device 21 supplies as the positional control voltage Vc a voltage between V5 and V6 set by a variable resistor, and sets, for instance, the minimum operation torque at a control voltage V5 and the maximum operation torque at a control voltage of V6 (e.g. V6≦V4).

As, according to such a configuration, the comparator 47 detects any variation in the voltage Va and supplies a high signal when the zooming switch 20 is operated, and the switch 48 supplies the voltage V4 in response to its switching to the terminal b, the computing unit 49 computes V4–Vb. Regarding this output voltage Vb, for example the disconnected state (disconnecting position) of the movable disk 26 is set to be supplied as V5 or V6 and their connecting position as V4, and if Vb=V5 holds at the moment, the computed voltage of V4–V5 will supplied to the power amplifier 50 to actuate the clutch operating motor 37, the movable disk 26 being driven to its disconnected state to the connecting position. When this movable disk 26 reaches the connecting position, Vb=V4 is supplied from the potentiometer 41, and this reduces the output of the computing unit 49 to 0 to stop the motor 37.

On the other hand, when the zooming switch 20 is released from its pressed down state, the voltage Va is reduced to 0, so that a low signal causes the switch 48 to be turned to the terminal a to supply a voltage Vc=V5, for instance, with the result that the computing unit 49 computes V5–V4, and the power amplifier 50 into which this differential voltage has been entered reverses the clutch operating motor 37 to drive the movable disk 26 to its disconnected state. Thus, when the output of the potentiometer 41 has become Vb=V5, the output of the computing unit 49 is reduced to 0 to stop the motor 37, and the movable disk 26 reaches its disconnecting position.

Then, the positional control voltage Vc set by the volume control device 21 takes a value in a range of V5 to V6 and, when the voltage V5 is supplied, the clutch operating motor 37 arranges the movable disk 26 in the farthest disconnecting position from the fixed disk 27 or, when the voltage V6 is supplied, the movable disk 26 is arranged in the disconnecting position where it presses the fixed disk 27 with the greatest pressure. Therefore, the operation torque of the zooming ring 18 will vary with the level of this voltage Vc and, if the voltage V6 is set equal to V4, a connecting position voltage, the zooming ring 18 will be placed in an immovable position.

In the second embodiment having the above mentioned configuration, when the zooming switch 20 is released from its pressed down state in the connected state of the clutch mechanism shown in FIG. 1, the manual control voltage Vc, for instance V5, set by the volume control device 21 is supplied from the switch 48, so that the movable disk 26 of the clutch mechanism is separated into the farthest position from the fixed disk 27 as described with reference to FIG. 5. This is the state illustrated in FIG. 2, wherein the revolutions of the clutch operating motor 37 turn the screwed moving gear 31 via the axial gear 38 to move members from this moving gear 31 to the movable disk 26 toward the front side (the left side in the drawing). As a result, the movable disk 26 is separated from the fixed disk 27 into a disconnected state.

In this disconnected state, the manual operation torque of the zooming ring 18 at its minimum, i.e. an extremely light state is achieved, and this operation torque can be adjusted with the volume control device 21. Thus, this volume control device 21 can set the positional control voltage Vc between V5 and V6 as stated above and, supposing a case in which an intermediate voltage $V_{5.5}$ between V5 and V6 is set, supplying of $V_{5.5}$–V5 from the computing unit 49 would resulting the driving of the clutch operating motor 37 until Vb=$V_{5.5}$ is reached, and the movable disk 26 will move in the direction of pushing the fixed disk 27 to increase the frictional force between them.

In this case, therefore, the zooming ring 18 can be moved with an intermediate manual operation torque and, if, a voltage of V6 mentioned above is fed, it will be possible to set the maximum operation torque. In this way, the zooming ring 18 can be manually operated with the operation torque set with the volume control device 21, and the zoom lens is driven correspondingly to that operating direction.

Then, when the zooming switch 20 is pressed in the state illustrated in FIG. 2, detection by the comparator 47 of FIG. 5 causes the switch 48 to set the electric control voltage V4, so that the clutch operating motor 37 to revolve on the basis of the result of computation V4–$V_{5.5}$ with the positional control voltage $V_{5.5}$ (Vb) of the potentiometer 41, and the clutch mechanism is connected, thereby to automatically drive the zoom lens correspondingly to the operating direction and the extent of pressing of the zooming switch 20.

As described above, the second embodiment of the invention makes it possible to vary the manual operation torque of the lens operating ring as desired, and provides a lens barrel apparatus convenient to handle.

Third Embodiment

Figure 8:
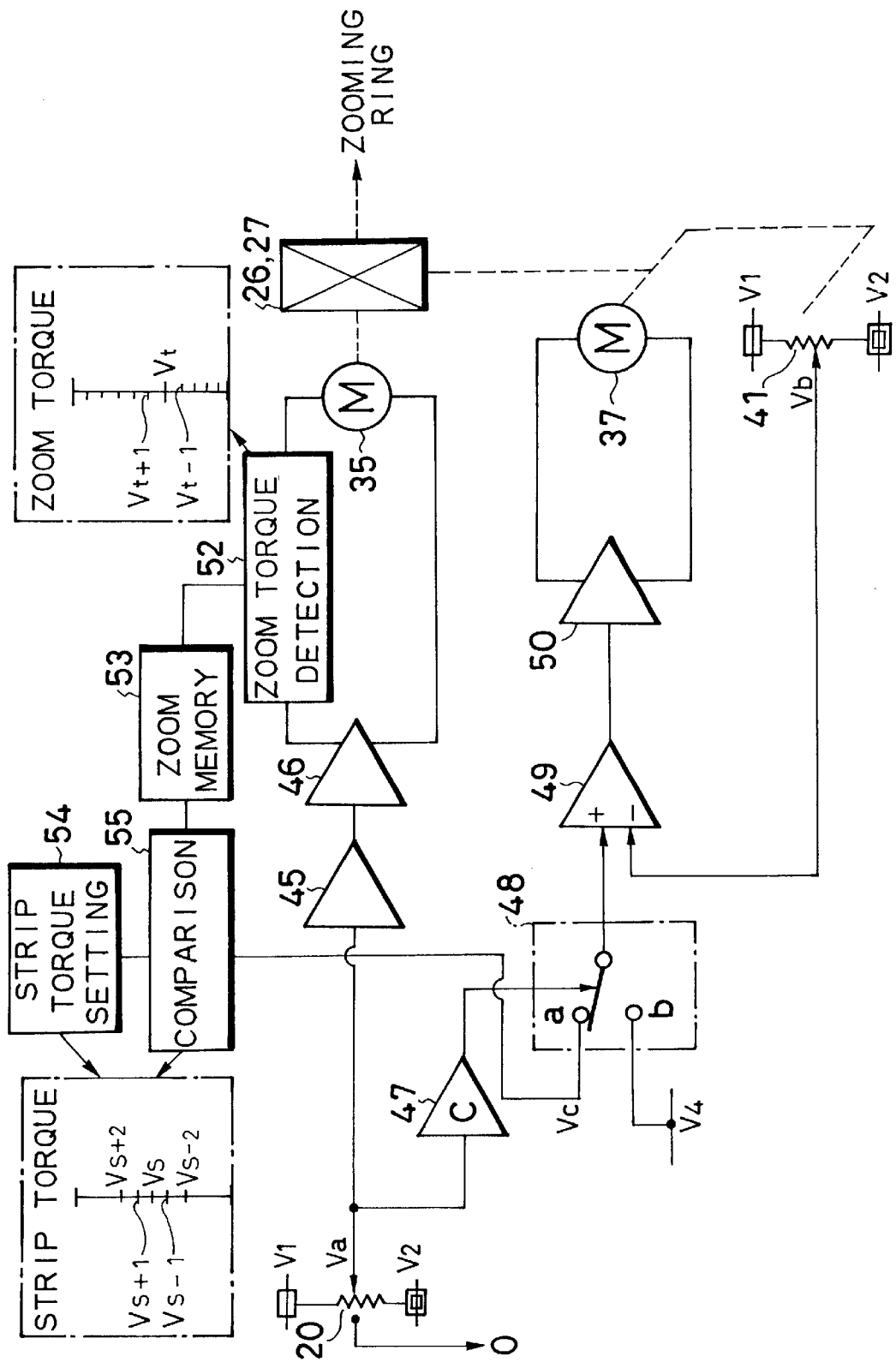
FIG. 8 is a circuit diagram illustrating the electric configuration of a manual and electric motor operated apparatus for lens barrels pertaining to a third embodiment of the present invention.

FIG. 8 illustrates the electric configuration of an apparatus pertaining to a third embodiment of the present invention, of which the basic configuration of the lens barrel is similar to those of the first and second embodiments. In this particular example, the manual operation torque of the zooming ring 18 by varying the rotating position of the moving gear 31 by using the clutch operating motor 37 of FIG. 1 and adjusting the pressing force (frictional force) of the movable disk 26 upon the fixed disk 27 via the coil spring 28.

In FIG. 8, to the seesawing zooming switch 20 on the left side of the drawing is connected the power amplifier 46 of the zoom motor 35 via the preamplifier 45, and this zoom motor 35, as described above, drives the zooming ring 18 via the fixed disk 27 and the movable disk 26. Further the switch 48, when the comparator 47 is supplying a low signal, is connected to the terminal a to supply the positional control voltage Vc for setting the manual operation torque to be described in further detail below or, when a high signal is being supplied, switches to the terminal b to set the positional control voltage V4 for clutch connection.

Following this switch 48 is provided the computing unit 49 for computing the difference between the output voltage of the switch 48 and the output voltage Vb of the potentiometer 41 shown in the lower part of the drawing, and to this computing unit 49 is connected the power amplifier 50 of the clutch operating motor 37, so that the circuit performs positional servo control.

The zoom motor 35 is also provided with zoom torque detecting circuit 52, to which a zoom memory 53 is connected. The zoom torque detecting circuit 52 detects the driving current for the motor 35 and converts it into a voltage, supplies this voltage as the drive torque of the zooming ring (zoom lens) 18, and stores this voltage datum into the zoom memory 53.

There are further provided a slip torque setting circuit (manual operation torque setting circuit) 54 for setting the slip torque in the clutch mechanism and a comparator circuit 55 for comparing the output of this circuit 54 and that of the zoom memory 53. This comparator circuit 55 keeps the set manual operation torque constant by comparing the torque setting voltage supplied from the slip torque setting circuit 54 with the torque detection voltage supplied from the zoom memory 53, and providing the comparison output to the clutch operating motor 37 via the switch 48 as the control voltage Vc. Thus, when the drive torque has become too heavy, the slip torque (frictional force) is lessened, and when the drive torque has become too light, the slip torque is increased to maintain the final manual operation torque at a prescribed level.

As, in this configuration, the comparator 47 detects any variation in the voltage Va to supply a high signal when the zooming switch 20 is operated, and the switch 48 supplies the voltage V4 in response to its switching to the terminal b, the computing unit 49 computes V4–Vb. This computed voltage is supplied to the power amplifier 50 to thereby actuate the clutch operating motor 37, and the movable disk 26 is drive from its disconnected state to the connecting position. When this movable disk 26 reaches its connecting position, Vb=V4 is supplied from the potentiometer 41, and this reduces the output of the computing unit 49 to 0 to stop the motor 37. In this state, the power amplifier 46 drives the zoom motor 35 on the basis of the output voltage Va of the zooming switch 20.

On the other hand, when the zooming switch 20 is released from its pressed down state, the voltage Va is reduced to 0 and the switch 48 is switched to the terminal a by a low signal to supply the control voltage Vc, so that the computing unit 49 computes Vc–V4, and the power amplifier 50 into which this differential voltage is entered reverses the clutch operating motor 37. Then at a point of time where the output Vb of the potentiometer 41 becomes identical with Vc, the motor 37 stops, and the movable disk 26 reaches its disconnecting position.

The positional control voltage Vc then is set by the slip torque setting circuit 54 and the comparator circuit 55, and the clutch mechanism is not fully disconnected, but the movable disk 26 is kept in contact with the fixed disk 27 to generate a frictional force of a prescribed level. A prescribed manual operation torque at the time of manual zooming is thereby set. In this particular example, the drive torque during automatic operation is detected by the zoom torque detecting circuit 52 and stored by the zoom memory 53, so that the comparator circuit 55 supplies a voltage resulting from the comparison of this detected voltage in the memory 53 and the set voltage set by the slip torque setting circuit 54.

For instance, as shown in FIG. 8, the detected zoom (drive) torque being represented by Vt and the set slip torque by Vs, Vs–Vt is supplied as the control voltage Vc. When the detected zoom torque becomes too heavy, reaching Vt+1, the slip torque voltage Vs–Vt+1=Vs–1 (lower than the voltage Vs) is supplied as the voltage Vc, and the manual operation torque is thereby kept constant.

In the third embodiment having the above mentioned configuration, when the zooming switch 20 is pressed in the state of FIG. 2, the connection of the movable disk 26 and the fixed disk 27 as shown in FIG. 1 causes the revolutions of the zoom motor 35 to be transmitted to the zooming ring 18 via the gear 36, fixed disk external gear 27G and movable disk external gear 26G. This causes the zoom motor 35 to revolve correspondingly to the operating direction and the extent of pressing of the zooming switch 20 and the zoom lens to be automatically driven. When this zoom motor 35 is driving, the drive torque is detected by the zoom torque detecting circuit 52, and the detected voltage is stored into the zoom memory 53.

On the other hand, when the zooming switch 20 is released from its pressed down state, the switch 48 of FIG. 8 is switched to the terminal a, and the manual control voltage Vc(Vs–Vt) is supplied and, as illustrated in FIG. 2, the movable disk 26 of the clutch mechanism is separated from the fixed disk 27. As a result, the apparatus is ready for manual operation. Although the disconnected state is represented by a clearly noticeable gap here in FIG. 2, actually the movable disk 26 and the fixed disk 27 are in contact with each other so as to generate a prescribed level of frictional force. The slip torque generated by this frictional force is controlled at the above mentioned control voltage Vc=Vs–Vt, and the operation torque of the zooming ring 18 is set to a prescribed level.

Then, when the lens barrel 14 is replaced with another, or such conditions as the ambient temperature or the application of grease have changed, the zoom torque may vary, but even in this case the manual operation torque is kept constant. Thus, even if the zoom torque has become heavier, reaching Vt+1 for instance as mentioned above, a slip torque voltage Vs–1, lower than the immediately preceding voltage Vs, is supplied as the voltage Vc there to control the manual operation torque at a constant level.

Although the value of the slip torque setting circuit 54 is supposed to be fixed in the foregoing description of the third embodiment, it is also possible for the user to set the operation torque of the zooming ring 18 by linearly varying this value. Thus, considering differences among users in the manual power and/or preference, the slip torque setting circuit 54 may be configured so as to be variable with something like an adjusting screw to allow setting from outside, each user can set the manual operation torque as desired.

As hitherto described, the third embodiment enables the operation torque to be maintained at a desired level even the lens barrel is replaced, various lens barrels are to be fabricated, unevenness arises in the manufacturing process, and/or such conditions as the ambient temperature or the application of grease have changed.

Although the foregoing description of the second and third embodiments refers to the application to a zooming ring 18, this configuration is applicable to the focusing ring as well.

Fourth Embodiment

FIGS. 9 through 12 illustrate the structure of a manual and electric motor operated apparatus for lens barrels pertaining to a fourth embodiment of the present invention permitting correction of pumping. First will be described the overall structure of the lens barrel with reference to FIG. 11. On the circumference of a lens barrel 214 shown in FIG. 11, the focusing ring 17 and the zooming ring 18 rotatable either manually or electrically are fitted, and on the circumference of this zooming ring 18 are formed external gear 19 for electric driving. Further, the zooming switch 20 for zooming operation is fitted to the handle and the like arranged on the circumference of the lens barrel 214.

This zooming switch 20 consists of a seesaw switch whose two ends, one set in the telescopic (expanding) direction and the other set in the wide angle (contracting) direction, are moved up and down like a seesaw, and is set to increase the varying speed according to, for example, the pressed depth. To the body ring 22 of this lens barrel 214 are fitted a clutch mechanism and a revolving-while-declutched mechanism.

These mechanisms are similar those described with reference to FIG. 1 and other drawings. The movable disk 26 and the fixed disk 27 are fitted rotatably to the circumference of the main shaft 25; on the circumferences of these movable disk 26 and fixed disk 27 are formed the external gears 26G and 27G, respectively; with this external gear 26G engage the external gear 19 of the zooming ring 18; in the movable disk 26 functioning as a clutch disk is formed a round groove (frictional face) H having tapered sides and, engaging with this round groove H, a fitting projection (frictional face) I similarly having tapered sides; this movable disk 26 is provided with a first thrust bearing 30 via a coil spring 28. Therefore, the frictional contact between the round groove H and the fitting projection I and the pressure of the coil spring 28 achieve clutching. Further, the disk 30A, coil spring 28 and movable disk 26 revolve separately from the moving gear 31 side, and function as a revolving-while-declutched mechanism to let the movable disk 26 turn separately from the fixed disk 27 during manual operation.

On the other hand, the second thrust bearing 33 is arranged on the fixed disk 27 side as well, and its rear side disk 33A is fixed to the main shaft 25. With the external gear 27G of the fixed disk 27 engages the axial-gear 36 of the zoom motor (electric motor) 35, and the rotational driving power of this zoom motor 35 is provided to the zooming ring 18 via the axial gear 36, fixed disk external gear 27G, movable disk external gear 26G and external gear 19.

Further, the axial gear 38 of the clutch operating motor 37 engages with the moving gear 31 on the first thrust bearing 30 side. Therefore, by causing the moving gear 31 to be turned by the clutch operating motor 37 in a prescribed direction, the movable disk 26 can be pressed against the fixed disk 27 or, if the motor 37 is turned in the reverse direction, the movable disk 26 can be separated from the fixed disk 27. To the axial gear 38 of this clutch operating motor 37 is connected the potentiometer 41 via the gear 40, and this potentiometer 41 detects the rotating state of the moving gear 31 on the first thrust bearing 30 side, i.e. the pressing state of the movable disk 26.

To the external gear 19 of the zooming ring 18 is also fitted, via a gear 242, a zooming potentiometer 243 for detecting the zooming position. On the other hand, external gear 244 are also formed on the focusing ring 17, a focusing potentiometer 246 is connected to the external gear 244 via a gear 245, and this arrangement makes possible detection of the rotational position of the focusing ring 17, i.e. the focusing position.

Figure 9:
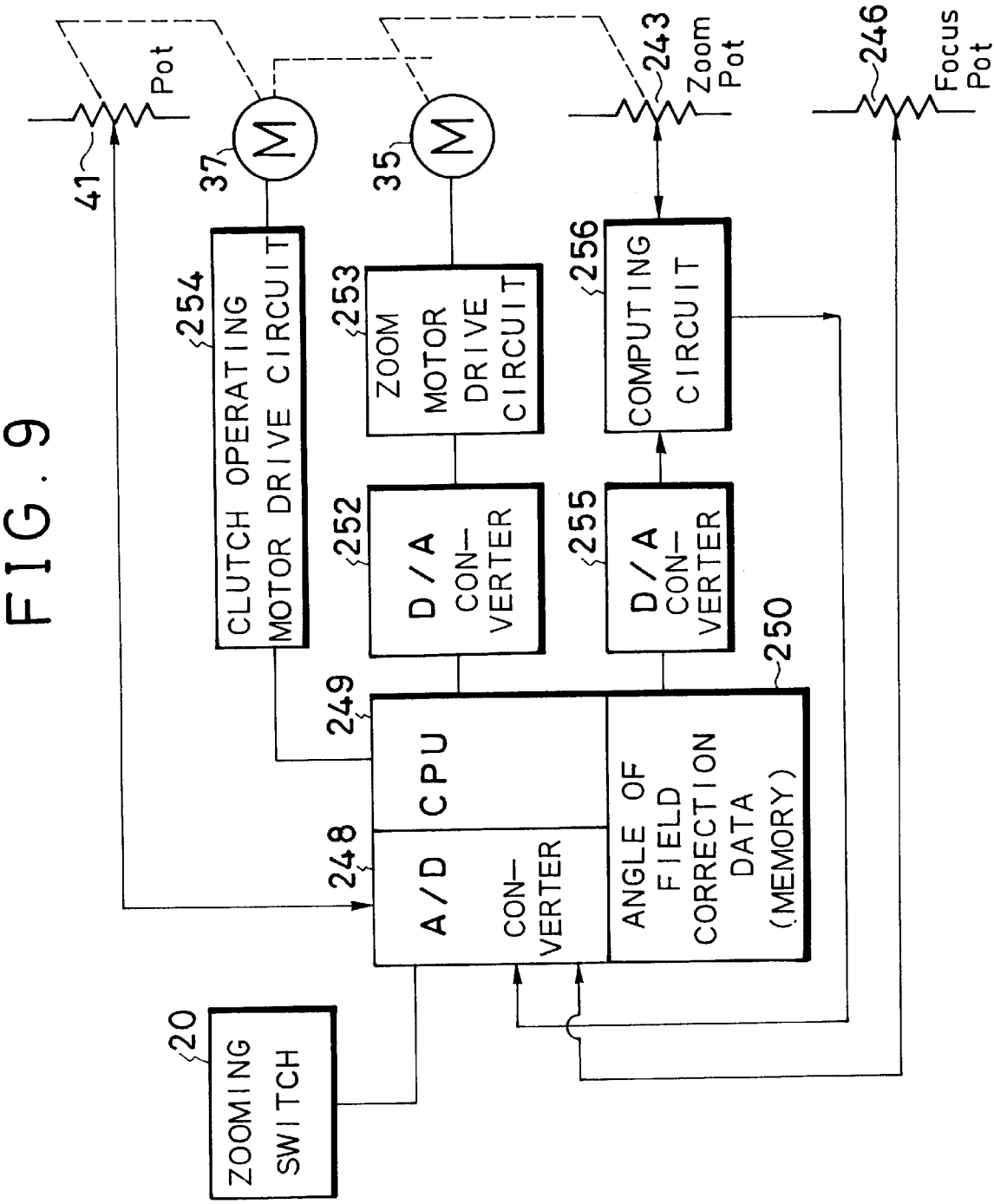
FIG. 9 is a block diagram illustrating the circuitry of a manual and electric motor operated apparatus for lens barrels pertaining to a fourth embodiment of the present invention permitting correction of pumping.

FIG. 9 shows the electric configuration of the fourth embodiment. As illustrated, there is provided a CPU 249 for integrated control for entering a control signal from the zooming switch 20 on the left side via an A/D converter 248, and to this CPU 249 is connected a memory 250 for storing angle of field data for use in correcting any variation in the angle of field that may occur at the time of focusing.

To the CPU 249 is connected zoom motor drive circuit 253 for controlling the drive of the zoom motor 35 via a D/A converter 252, and also is connected a clutch operating motor drive circuit 254 for controlling the drive of the clutch operating motor 37. To this CPU 249 is connected a computing circuit 256 via a D/A converter 255, and this computing circuit 256 computes (e.g. adds) the zoom position signal detected by a zooming potentiometer 243 and a zoom control position signal or a zoom correcting position signal supplied by the CPU 249, and returns the result to the CPU 249 as a zoom control signal. Thus the CPU 249 performs servo positional control by driving the zoom motor 35 with a signal resulting from the zoom position control signal formed by the action of the zooming switch 20 and the current zoom position signal.

On the other hand, if focusing is controlled when manual zooming is being awaited, the clutch operating motor 37 is operated via the drive circuit 254 to connect the clutch mechanism, and a zoom correcting position signal is calculated by reading angle of field correction data stored in the memory 250 on the basis of the current zoom position and focusing position supplied from the zooming potentiometer 243 and focusing potentiometer 246, respectively. This correcting position signal is computed by the computing circuit 256 with the detection output of the potentiometer 243, and the result is returned to the CPU 249. On the basis of this computed output, the zoom motor 35 is driven via the CPU 249 and the drive circuit 253, and the zoom lens is thereby moved in the direction of correcting the angle of field.

The actions of the fourth embodiment, which is configured as described above, will now be explained. In this fourth embodiment as well, when the zooming switch 20 is released from its pressed down state in the connected state shown in FIG. 1, the revolutions of the clutch operating motor 37 turns the screwed moving gear 31 via the axial gear 38 to move members from this moving gear 31 to the movable disk 26 toward the front side (the left side in the drawing). As a result, the movable disk 26 is separated from the fixed disk 27 into a disconnected state so that the zooming ring 18 becomes manually operable when the zooming switch 20 is not operated, and it becomes possible to drive the zoom lens correspondingly to the direction of manual operation.

On the other hand, when the zooming switch 20 is pressed, the clutch operating motor 37 turns on the basis of the electric control voltage and the positional voltage of the potentiometer 11, and the backward movement of the moving gear 31 screwed into the main shaft 25 causes, as illustrated in FIG. 1, the moving disk 26 to be pressed against the fixed disk 27 via the coil spring 28. This connection of the clutch mechanism results in automatic driving of the zoom lens according the extent of the zooming switch 20 is pressed down.

Then, if the focusing ring 17 is driven either manually or electrically when the zooming switch 20 has been released from its pressed down state to make possible manual zooming, correction of the angle of field (correction of pumping) is accomplished. The process of zooming including this correction is shown in FIG. 10.

Figure 10:
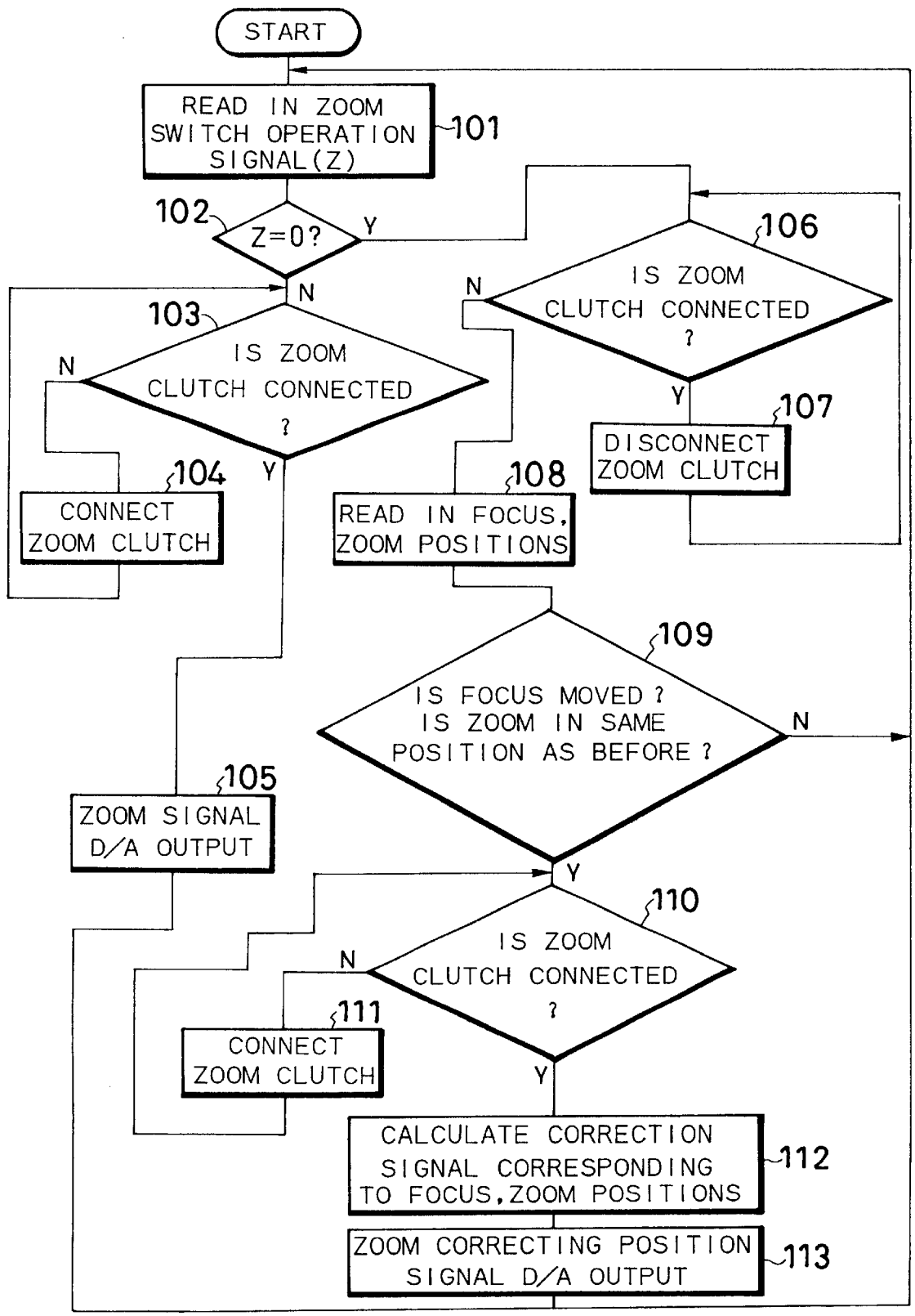
FIG. 10 is a flow chart showing the action to correct pumping (correct the angle of field) in the fourth embodiment.
Figure 11:
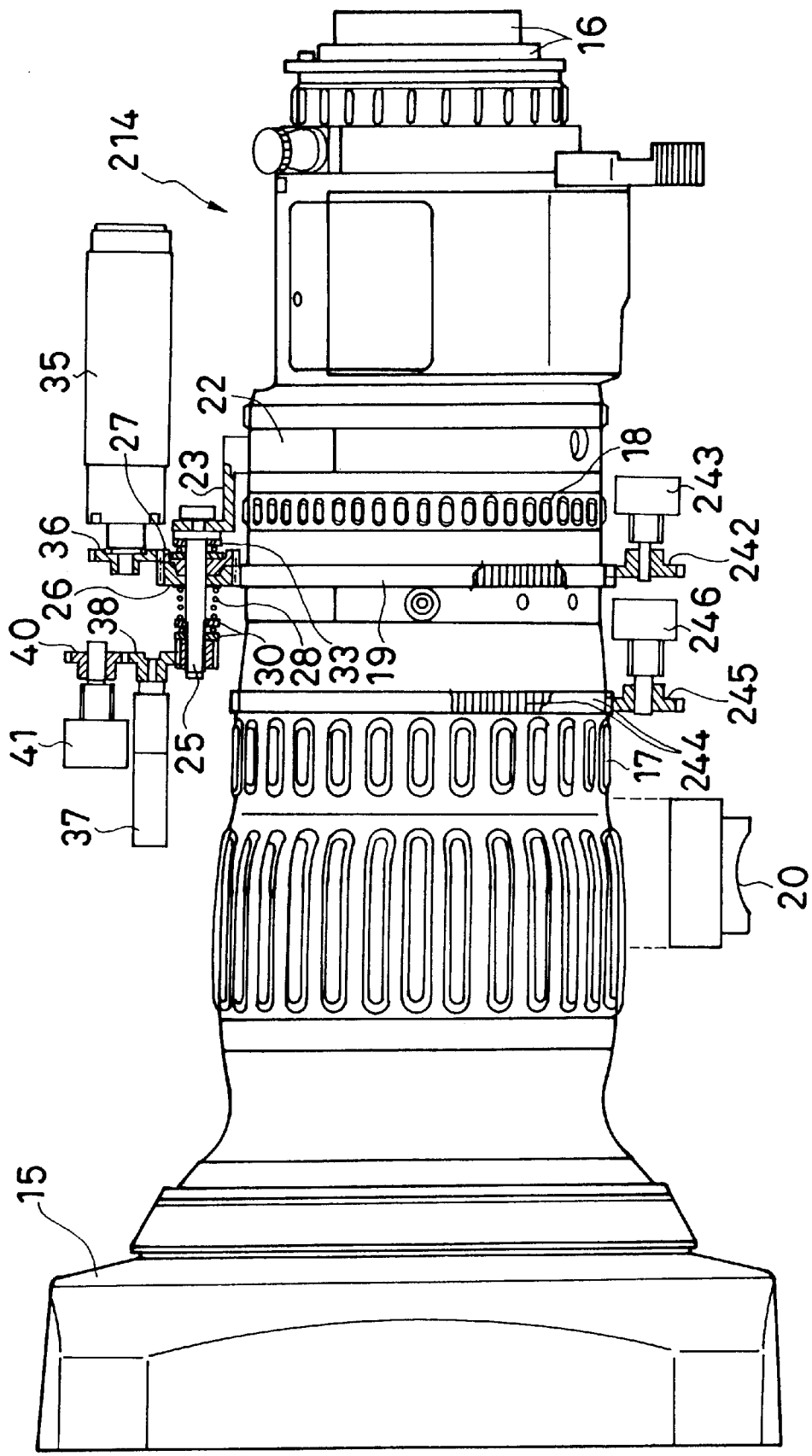
FIG. 11 illustrates an overall configuration of the apparatus which is the fourth embodiment of the invention.
Figure 13A:
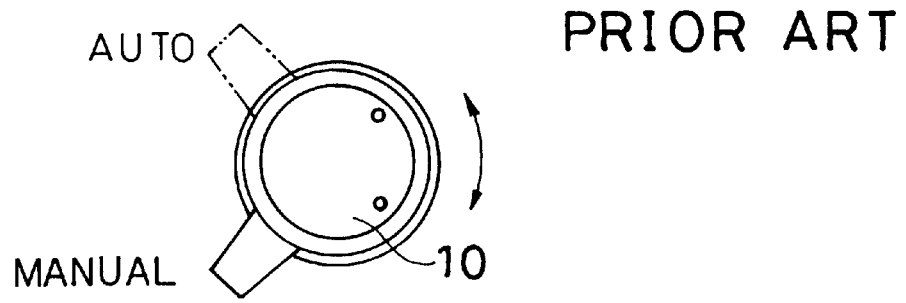
FIGS. 13(A) and 13(B) illustrates the structure of a lens barrel permitting switching between manual and electric operating modes according to the prior art.
Figure 13B:
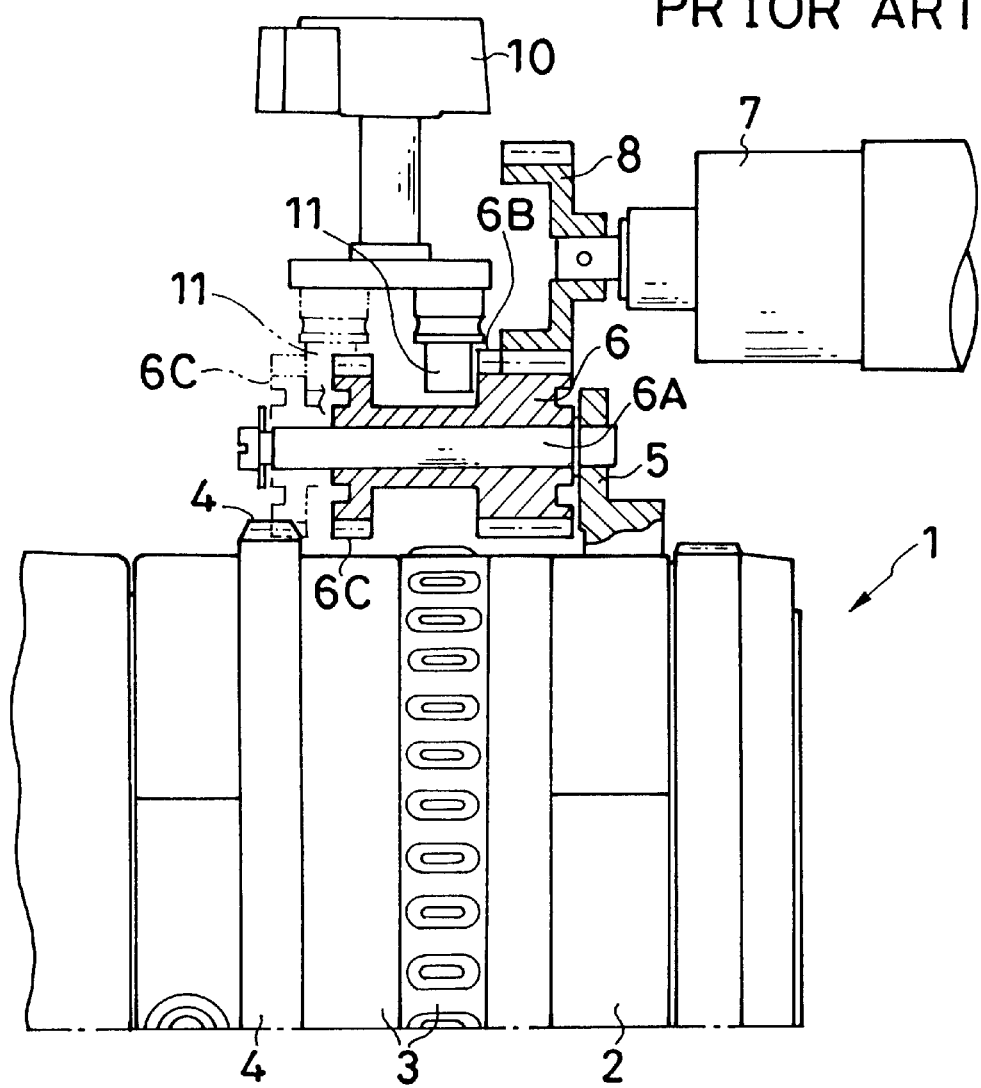

In FIG. 10, an operational signal (Z) for the zooming switch 20 is read in at step 101; it is determined at step 102 whether or not this operational signal Z is 0; and the process moves ahead to step 103 if the answer is "NO." At this step 103, it is determined whether or not the zooming clutch mechanism connected or not and, if it is not, the clutch mechanism is connected at step 104 or, if it is, the operational signal of the zooming switch 20 is subjected to D/A conversion and supplied at step 105. Here, the zoom lens is driven to a prescribed position by causing the zoom motor drive circuit 53 to actuate the zoom motor 35 on the basis of a zooming signal.

On the other hand, if the answer is "YES" at the foregoing step 102, i.e. if zooming is to be manually set, the process will go ahead to step 106, where it is determined whether or not the zooming clutch mechanism is connected and, if "YES," the zooming clutch mechanism will be disconnected at step 107. Or if "NO" at the foregoing step 106, the process will go ahead to step 108, where the current focusing and zooming positions respectively detected by the potentiometers 43 and 46 will be read in. At the next step 109, it is determined whether of the zooming position is the same as before and the focusing position has been moved by the focusing ring 17 and, if "YES," i.e. if focusing has been done while manual zooming is awaited, it is determined at step 110 whether or not the zooming clutch is connected and the angle of field is corrected accordingly.

Thus, as the clutch is not connected when manual zooming is awaited, the answer will be "NO" at step 110, and the clutch mechanism will have to be connected by actuating the zooming motor 37 at step 111. Then, if "YES" at the foregoing step 110, the zoom position for correcting the angle of field is calculated by reading the datum of the angle of field out of the memory 50 corresponding to the current zoom and focusing positions at step 112, and that zoom correcting position signal is supplied to the computing circuit 56 via the D/A converter 55 at the next step 113. Then this computing circuit 56 supplies the CPU 49 with the computing signal (control signal) computed from the zoom correcting position signal and the current position signal supplied from the zoom potentiometer 43, the zoom motor 35 is driven on the basis of this computation control signal to move the zoom lens to the corrective zooming position. As a result, the angle of field is corrected correspondingly to the pumping.

FIG. 12 shows one example of correction of the angle of field. As indicated by arrows, where the angle of field varies so that the zoom moves toward a wider angle with a decrease in focusing distance, the angle of field should be corrected by moving the zoom toward the telescopic side. For instance if, when the distance is t do, the zoom is in the current position of a3 and the focusing distance is set to d1, the position will move to a31 and the angle of field will become a3'. Then, by correcting the zoom from the position of a31 to a31', an equal angle of field to the above mentioned a3 will be obtained. The image which is slight expanded by focusing is thereby contracted, and the variation in the angle of field is substantially eliminated. Thus, causing the zooming function to cancel the variation in the angle of field, the angle can be kept constant.

As hitherto described, the fourth embodiment of the invention has the advantage of being capable of maintaining the angle of field constant by correcting any pumping phenomenon that may arise in the process of focusing.

What is claimed is:

1. A manual and electric motor operated apparatus for lens barrels comprising:
    a lens barrel for holding lenses movably;
    an electric motor for automatically moving said lenses;
    a lens operating ring, arranged rotatably on the circumference of this lens barrel for manually moving said lenses, having external gear formed thereon to engage with a transmission gear for transmitting the revolutions of said electric motor;
    a clutch mechanism for connecting and disconnecting the external gear of this lens operating ring and said electric motor to and from one another;
    a clutch operating motor for connecting and disconnecting this clutch mechanism; and wherein:
        said clutch operating motor is driven on the basis of an operation control signal supplied by an electric operation switch, wherein an action to connect said clutch mechanism is executed when the operation control signal is supplied and to execute an action to disconnect the clutch mechanism is executed when the operation control signal is no longer supplied.

2. The manual and electric motor operated apparatus for lens barrels, as set forth in claim 1, wherein:
    said clutch mechanism has a gear moving plate which is moved by said clutch operating motor in the axial direction and has a gearing function and a gear fixing plate which is connected to the gear moving plate and has a gearing function, wherein one of these gears is connected to said electric motor side and the other is connected to the external gear of said lens operating ring; and
    a revolving-while-declutched mechanism for enabling the gear connected to the external gear of said lens operating ring to rotate when the clutch mechanism is disconnected.

3. The manual and electric motor operated apparatus for lens barrels, as set forth in claim 2, wherein:
    said clutch mechanism is provided with a moving gear for converting the revolutions of said clutch operation motor into a linear movement in the axial direction, so configured that the pressing force of the moving gear be provided to said gear moving plate via a spring, and a thrust bearing is arranged between said moving gear and said spring as said revolving-while-declutched mechanism.

4. The manual and electric motor operated apparatus for lens barrels, as set forth in claim 1, further comprising:

an operation torque varying unit using said clutch operating motor to adjust the pressing force of the frictional face of said clutch mechanism using said clutch operating motor during the disconnecting action, and thereby varying the manual operation torque of said lens operating ring.

5. The manual and electric motor operated apparatus for lens barrels, as set forth in claim 1, wherein said lens operating ring is a zooming ring.

6. The manual and electric motor operated apparatus for lens barrels, as set forth in claim 1, wherein said lens operating ring is a focusing ring.

7. A manual and electric motor operated apparatus for lens barrels comprising:
    an electric motor for automatically moving lenses arranged in a lens barrel;
    a lens operating ring, arranged rotatably on the circumference of said lens barrel for manually moving said lenses;
    a clutch mechanism for connecting and disconnecting the lens operating ring and said electric motor to and from one another;
    a clutch operating motor for connecting and disconnecting this clutch mechanism;
    a torque detecting circuit for detecting the drive torque for said lenses at the time of driving by said electric motor; and
    an operation torque setting unit for providing a manual operation torque to said lens operating ring by using said clutch operating motor to cause said clutch mechanism, when it is disconnected, to generate its frictional force and maintaining and setting the manual operation torque at a prescribed level by adjusting said frictional force on the basis of the output of said torque detecting circuit.

8. A manual and electric motor operated apparatus for lens barrels capable of pumping correction, comprising:
    an electric motor for automatically moving a zoom lens arranged in a lens barrel;
    a zooming ring, arranged rotatably on the circumference of said lens barrel for manually moving said zoom lens;
    a clutch mechanism for connecting and disconnecting the this zooming ring and said electric motor to and from one another;
    a clutch operating motor f or connecting and disconnecting the clutch mechanism; and
    an angle of field correcting unit for connecting, when focusing has been executed when manual zooming is set, said clutch mechanism by using said clutch operating motor and correcting any change in the angle of field due to focusing.

9. A manual and electric motor operated apparatus for lens barrels capable of pumping correction, as set forth in claim 8, provided with the angle of field correcting unit comprising:
    a zooming position detecting unit for detecting the rotational position of the zooming ring;
    a focusing position detecting unit for detecting the rotational position of the focusing ring; and
    a memory for storing angle of field correction data for correcting the angle of field which varies at the time of focusing.

10. A manual and electric motor operated apparatus for lens barrels comprising:

a lens barrel for holding lenses movably;

an electric motor for automatically moving said lenses;

a lens operating ring, arranged rotatably on the circumference of this lens barrel for manually moving said lenses, having external gear formed thereon to engage with a transmission gear for transmitting the revolutions of said electric motor;

a clutch mechanism for connecting and disconnecting the external gear of this lens operating ring and said electric motor to and from one another;

a clutch operating motor for connecting and disconnecting this clutch mechanism; and wherein said clutch mechanism has a gear moving plate which is moved by said clutch operating motor in the axial direction and has a gearing function and a gear fixing plate which is connected to the gear moving plate and has a gearing function, wherein one of these gears is connected to said electric motor side and the other is connected to the external gear of said lens operating ring; and a revolving-while-declutched mechanism for enabling the gear connected to the external gear of said lens operating ring to rotate when the clutch mechanism is disconnected.

11. The manual and electric mother operated apparatus for lens barrels, as set forth in claim 10, wherein:

said clutch mechanism is provided with a moving gear for converting the revolutions of said clutch operation motor into a linear movement in the axial direction, so configured that the pressing force of the moving gear be provided to said gear moving plate via a spring, and a thrust bearing is arranged between said moving gear and said spring as said revolving-while-declutched mechanism.

12. A manual and electric motor operated apparatus for lens barrels comprising:

a lens barrel for holding lenses movably;

an electric motor for automatically moving said lenses;

a lens operating ring, arranged rotatably on the circumference of this lens barrel for manually moving said lenses, having external gear formed thereon to engage with a transmission gear for transmitting the revolutions of said electric motor;

a clutch mechanism for connecting and disconnecting the external gear of this lens operating ring and said electric motor to and from one another;

a clutch operating motor for connecting and disconnecting this clutch mechanism; and further comprising:

an operation torque varying unit using said clutch operating motor to adjust the pressing force of the frictional face of said clutch mechanism using said clutch operating motor during the disconnecting action, and thereby varying the manual operation torque of said lens operating ring.

* * * * *

UNITED STATES PATENT AND TRADEMARK OFFICE
CERTIFICATE OF CORRECTION

PATENT NO. : 6,456,796 B1
DATED : September 24, 2002
INVENTOR(S) : Minoru Tanaka, Keiji Kaneko and Hidetomo Tateno It is certified that error appears in the above-identified patent and that said Letters Patent is hereby corrected as shown below:

<u>Column 16,</u>
Line 49, delete "f or" and substitute therefore -- for --.

<u>Column 17,</u>
Line 28, delete "mother" and substitute therefore -- motor --.

Signed and Sealed this

Twenty-fifth Day of February, 2003

JAMES E. ROGAN
*Director of the United States Patent and Trademark Office*